United States Patent [19]
Cleaver et al.

[11] 3,973,592
[45] Aug. 10, 1976

[54] FLUID FLOW DIVERTER

[75] Inventors: John C. Cleaver, Riverhills; Gordon F. Leitner, Elm Grove; Fred G. Wiegratz, Wauwatosa, all of Wis.

[73] Assignee: Water Services of America, Inc., Milwaukee, Wis.

[22] Filed: Jan. 27, 1975

[21] Appl. No.: 544,567

[52] U.S. Cl. ........................ 137/625.43; 137/625.46
[51] Int. Cl.² ........................................ F16K 11/083
[58] Field of Search ................... 137/625.21, 625.24, 137/625.43, 625.46, 625.47

[56] References Cited
UNITED STATES PATENTS

| | | | |
|---|---|---|---|
| 2,344,714 | 3/1944 | Martin | 137/625.43 X |
| 2,532,003 | 11/1950 | Wyer | 137/625.43 |
| 2,907,349 | 10/1959 | White | 137/625.23 |
| 3,115,160 | 12/1963 | Rogers | 137/625.23 |
| 3,194,267 | 7/1965 | Lyon et al | 137/625.43 X |
| 3,307,583 | 3/1967 | Harter | 137/625.43 |

*Primary Examiner*—Henry T. Klinksiek
*Attorney, Agent, or Firm*—Ralph G. Hohenfeldt; Fred Wiviott

[57] ABSTRACT

A fluid flow diverter or reverser comprises a housing having a transverse separator wall dividing it into first and second axially adjacent chambers. The first chamber has a diametrally extending separator wall dividing it into subchambers. Each subchamber has an inlet or outlet, respectively, to which a conduit, that may serve as the feed or return of a process loop circuit or the feed or return of a fluid supply circuit, is connected. The transverse wall has a pair of openings which communicate the respective subchambers with the second chamber. The second chamber has inlet and outlet openings, respectively, which can connect to a fluid supply and return circuit or a process loop circuit. A diverter blade in the second chamber is reversibly rotatable for changing direction of fluid flow between the inlets and outlets and, hence, in the loop circuit.

17 Claims, 13 Drawing Figures

FLUID FLOW DIVERTER

BACKGROUND OF THE INVENTION

This invention relates to diverter for reversing the direction of flow in a fluid circuit.

Although the new diverter may be used in a variety of fluid circuits, it will be illustrated in reference to a heat exchanger or cooler. A well known type of heat exchanger comprises a cylindrical tank having tube sheets spaced from its opposite ends. The tube sheets are connected by a bundle of tubes which is divided into upper and lower halves by a longitudinal separator such that cooling fluid may enter one end of the tank and flow through one half of the tubes in one direction and the other half of the tubes in the reverse direction so that the inlet and outlet of the tube bundle are at the same end of the tank. Fluid or vapor which is to be cooled, heated or condensed flows over the outside of the tubes in the space between the tube sheets and, of course, there are inlet and outlet connections to this space.

In a practical case, the cooling water which is circulated through the interior of the tubes in the bundle have some dissolved minerals which deposit on the inner walls of the tubes and it is known that this results in scale formation unless the deposit is frequently removed. It is well known that chemical treatment of the cooling water alone is not sufficient to completely prevent sedimentation or fouling. Even when mechanical or chemical cleaning appears to be required infrequently, such as once or twice a year, it is not uncommon to find that the average fouling which occurs between cleaning is sufficient to produce a substantial reduction is heat transferability. In air conditioner systems, for instance, where hot gases are cooled in the heat exchanger and the heat dissipated by means of a water cooling tower, the fouling can result in substantial extra energy being required in the system.

One method of coping with tube fouling is to force brushes through the tubes one or more times per day in opposite directions. A method and means for propelling brushes through the tubes without accessing the interior of the heat exchanger is described in U.S. Pat. No. 3,319,710. In the patent each of the tubes in the bundle terminates in a cage. Cages at corresponding ends of the tubes have brushes parked in them at a given time. When it is desired to clean the tubes, flow direction through them is reversed and the brushes are propelled through the tubes to the cages at the opposite ends of the tubes, thus cleaning out the sedimentation.

The change in flow direction necessary to propel the brushes is accomplished at the present time by switching a four-way valve outside of the heat exchanger so that the inlet thereof becomes the outlet temporarily and the outlet becomes the inlet. Presently available four-way valves are constructed so that a large number of external connections are necessary to achieve flow reversal by actuating the valve. At least eight and sometimes as many as twelve elbows are required for typical installation of a four-way valve in a flow reversal circuit. As those practicing the art know, this has resulted in a maze of piping in the vicinity of the valve which occupied an inordinate amount of space and had an exceedingly unattractive appearance.

SUMMARY OF THE INVENTION

A primary object of the present invention is to provide a four-way valve, more aptly called a flow reversal diverter, which overcomes the above noted and other disadvantages.

Another basic object of the invention is to provide a diverter which has pairs of inlets and outlets that are integral with the diverter and that can be variously arranged in line with each other or at selected angles so that the flow directions are changed exclusively in the diverter and a large number of external fittings are not needed.

Additional objects of the invention are to provide a diverter that can be installed with a minimum amount of labor, that has reduced internal pressure drop, and that reduces space requirements.

An embodiment of the new diverter is characterized by a cylindrical housing that has a diametrally extending wall separating it into axially adjacent first and second chambers. The first chamber is divided into two subchambers and these are connected to the second chamber by individual openings through the separator. The second chamber has a rotatable valve member or vane in it. It also has a pair of openings which can be used alternately as inlets or outlets. By external actuation, the vane can be positioned to direct flow from a subchamber to one outlet of the second chamber so that fluid may flow through a process loop circuit and return to the other opening of the second chamber. Moving the vanes to another angular position, causes fluid to flow from the one subchamber to an opening in the second chamber which then becomes the outlet and what was formerly the outlet then becomes the inlet which is returned to the other subchamber.

In a specific embodiment of the new diverter using the principles outlined above, the cylindrical casing of the diverter is flanged to the head of a heat exchanger in such manner that the ends of the tubes with the cases terminate directly in the diverter subchambers in which case external piping is further reduced.

The manner in which the foregoing objects and other more specifics of the invention are achieved will be evident in the more detailed description of an illustrative embodiment of the invention which will now be set forth in reference to the drawings.

DESCRIPTION OF A PREFERRED EMBODIMENT

Figure 1:
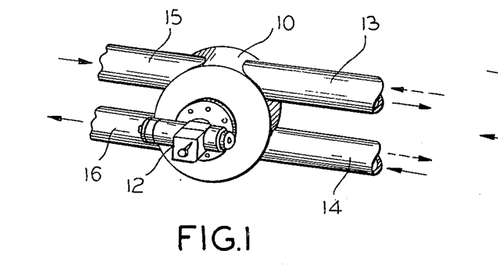
FIGS. 1 and 2 are perspective views of the new diverter showing, respectively, different arrangements of the inlet and outlet conduits and also showing an actuator.
Figure 2:
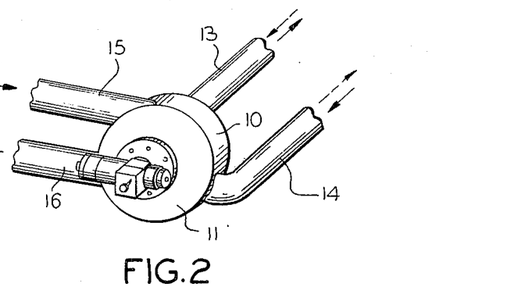

FIGS. 1 and 2 show the external appearance of the inverter. In FIG. 1 the inverter comprises a body 10 having a front end enclosure 11. The internal mechanism of the inverter, that is, the valve member to be described later, is turned or moved by an actuator 12. The actuator 12 may comprise a hydraulic or pneumatic work cylinder or it may be a rotary motor that is coupled for moving or rotating the valve member.

FIG. 1 shows two pairs of conduits connected to the inverter body 10. One pair, comprised of conduits 13 and 14, may supply a heat exchanger or some other process device, not shown, with cooling water, for example. For the sake of illustrating the invention, it is assumed that it is desired to alternately change the direction of flow in conduits 13 and 14. The other conduits 15 and 16 are feed and return conduits, respectively, in which flow direction remains constant in this example. Of course, it will be understood that conduits 13 and 14 can be connected to a source and return, respectively, and 15 and 16 can be connected in a process loop in which flow direction is desired to be reversed periodically. Note in this embodiment, that the conduits are in-line or in parallelism with each other which is the most desirable arrangement in some systems for minimizing the number of fittings that are necessary to connect the diverter into the system. In FIG. 1, normal flow direction may be considered to be from a source going into conduit 15 and out of conduit 13 and then to a process loop for return to conduit 14 and finally out and back to the source through conduit 16. When the diverter is actuated for reverse flow in an external loop, fluid from the source still flows in through conduit 15 and crosses over to go out of conduit 14 and then to a process loop for return to conduit 13 whereupon it goes back to the source through conduit 16.

FIG. 2 shows the same basic diverter with the conduits differently arranged. For instance, the external loop conduit 13 is now connected to the back of the diverter and the external loop conduit 14 remains at the side. FIGS. 1 and 2 show only two of many ways in which the diverter may be connected in different fluid conducting systems. It should also be understood that conduits 13–16 may, in accordance with the invention, be rotated through various angles within limits in the plane of the valve body 10 so that the ends of the conduits may join the body normally or tangentially.

Figure 3:
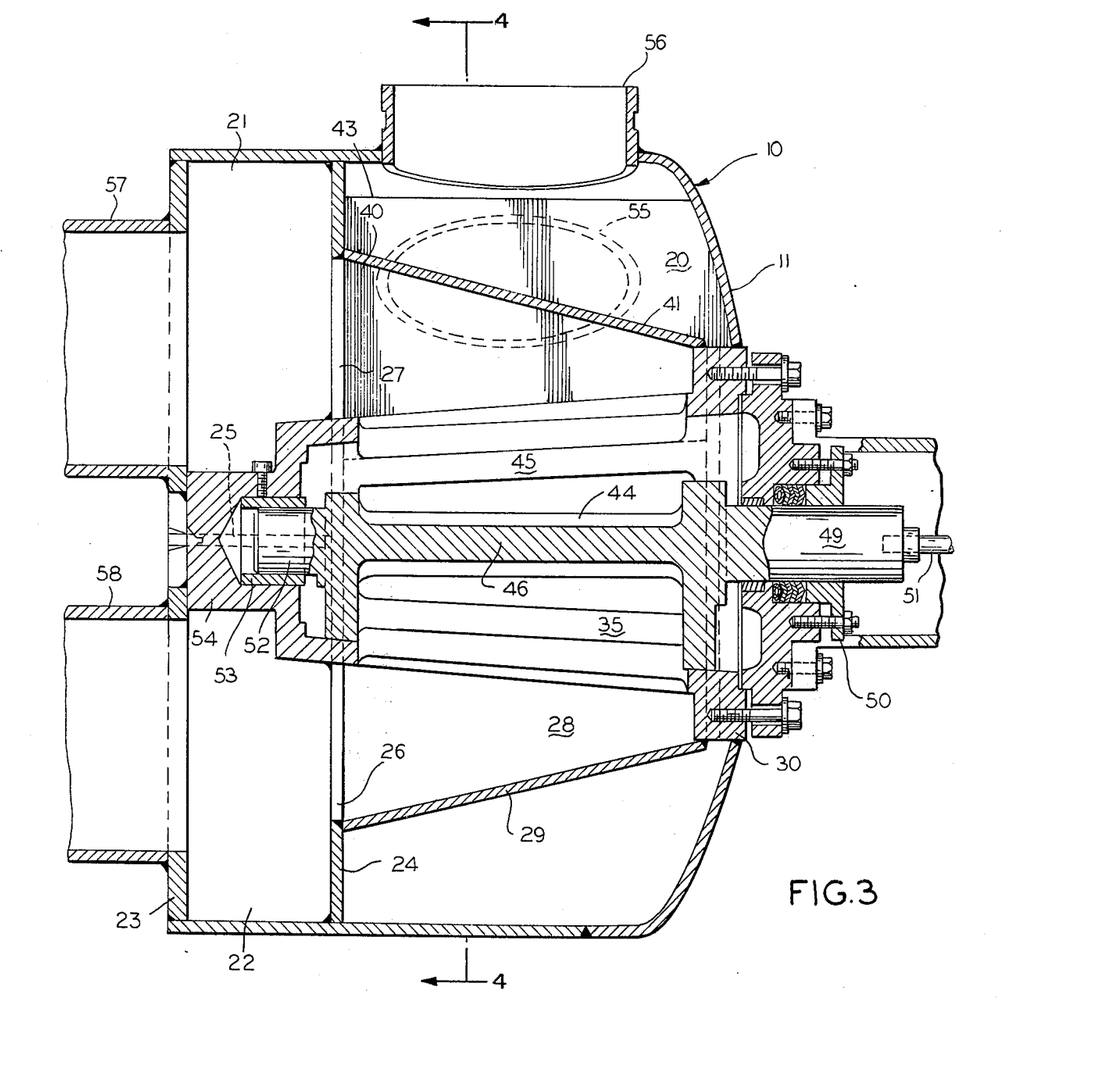
FIG. 3 is a longitudinal sectional view through one embodiment of the inverter.
Figure 4:
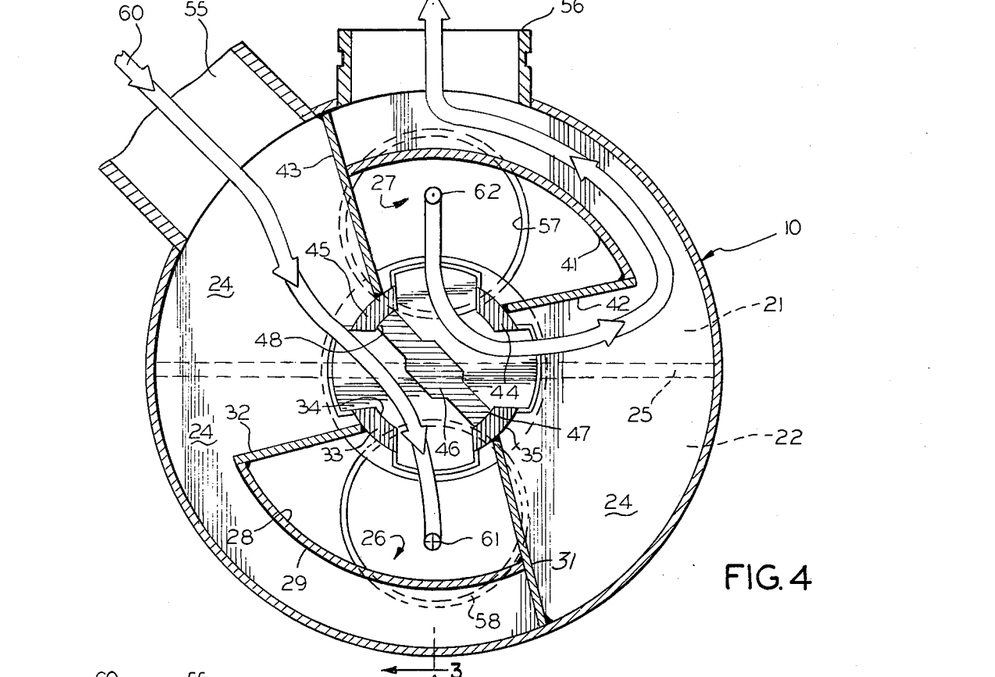
FIG. 4 is a transverse sectional view taken on a line corresponding with 4—4 in FIG. 3 showing the valve member positioned for effecting normal flow along the paths indicated by the arrowheaded lines.
Figure 5:
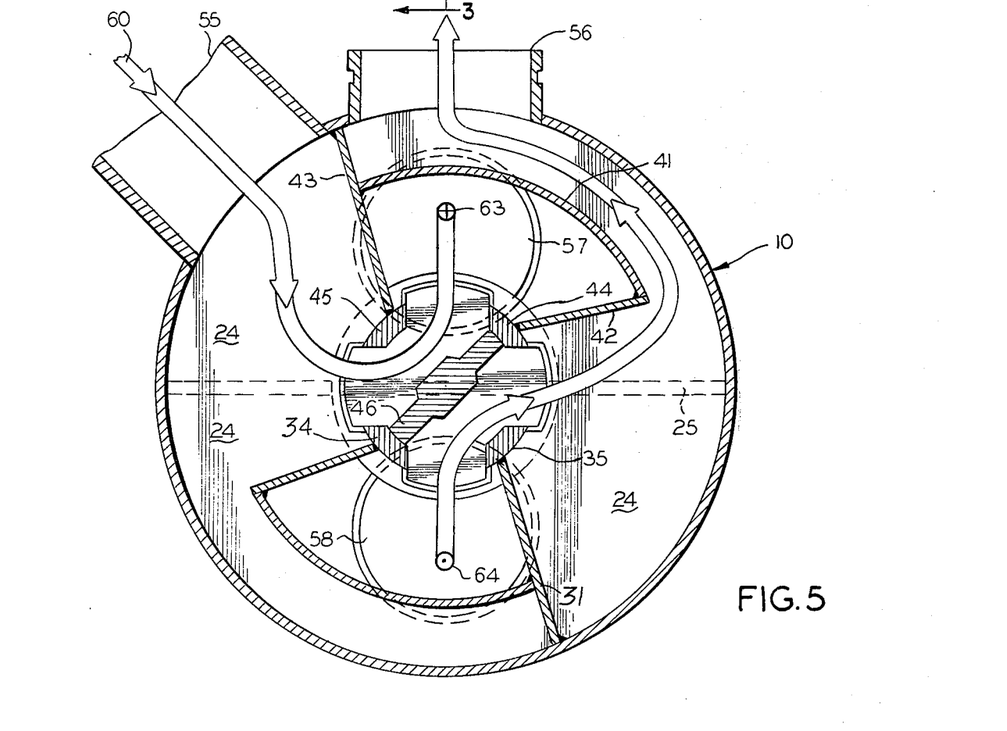
FIG. 5 is similarly taken along the line 4—4 in FIG. 3 except that the valve member is rotated to effect the flow paths indicated by the arrowheaded lines.

Refer now to the embodiment of the diverter depicted in FIGS. 3–5. FIG. 3 shows the body 10, which happens to be cylindrical in this example, divided into a main chamber 20 and two axially adjacent subchambers 21 and 22. The subchambers are bounded by the peripheral wall of housing 10, its end wall 23 and a separator plate 24. Subchambers 21 and 22 are isolated from each other by a partition wall or divider 25 which is shown in hidden lines in FIG. 3 but should be understood to extend diametrally across the cylindrical portion of body 10 to define semicircular subchambers 21 and 22.

Separator 24 has openings 26 and 27 on opposite sides of divider 25. Opening 26 leads to a chamber 28 that is defined by a longitudinally extending and inclined wall 29 which is closed at its end which is remote from opening 26 by a stationary radially extending flange 30 that is part of a valve structure as will be explained later. FIG. 4 shows that, in addition to chamber 28 being bounded by curved wall 29, it is also bounded by chordally directed walls 31 and 32 which together with curved wall 29 form a generally U-shaped chamber with the opening 26 in its bottom. Wall 32 is sealed to a valve seat 33 which has a curved inner face 34 and is substantially coextensive with longitudinally extending wall 32. Chordally directed wall 31 also has a similar longitudinally extending valve seat 35.

The other opening 27 in separator 24 leads to a generally U-shaped chamber 40 which is bounded by an inclined wall 41. Chamber 40 is also enclosed at one end by flange 30. Similarly to chamber 28, as can be seen in FIG. 4, chamber 40 is bounded by chordally directed and longitudinally extending walls 42 and 43 which terminate in longitudinally extending valve seats 44 and 45. Thus, in this embodiment, chambers 28 and 40 are disposed on opposite sides of divider 25 as are their respective openings 26 and 27 through separator plate 24.

A rotatable plug valve member 46 which has its opposite edges 47 and 48 tapered longitudinally is positioned to define a flow path in one direction in FIG. 4 and the valve member 46 is angulated in FIG. 5 to define another reverse flow path.

FIG. 3, shows that valve member 46 is rotatable on a shaft 49 that extends through a sealing gland 50. Shaft 49 may be driven by a stem 51 that derives rotational power from actuator 12. It should be understood, however, that valve member 46 can be rotated by a link, not shown, extending in sealing relation through the wall of housing 10.

Valve member 46 has an integral shaft 52 journaled in a sleeve bearing 53 that is fixed in a stationary body 54 centrally of subchambers 21 and 22. The valve seats 34, 35 and 44, 45 in the valve chamber are substantially 90° apart in this embodiment. Seats 34 and 35 define the margins of chamber 28 and form a path to its opening 26 and seats 44 and 45 define the margins of chamber 40 and form a path to its opening 27.

In FIG. 3 the opening 55 shown as a hidden line in housing 10 may be considered to be the inlet from a source in which a constant flow direction is maintained. A nipple 56 may be considered the place for connecting a conduit which serves as a return to the source in which flow direction is also constant. The process loop in which flow direction is to be reversed comprises conduits 57 and 58 at the back end of the diverter. Conduit 57 connects with subchamber 21 and conduit 58 connects with subchamber 22.

The operating mode of the embodiment depicted inn FIGS. 3–5 will now be discussed. FIG. 4 shows the diverter set for what is arbitrarily called normal flow direction. Valve member or vane 46 is in sealing engagement with seats 35 and 45 in this mode. The infeed direction of the fluid is indicated by the arrowheaded line 60 passing through inlet 55. The fluid then flows over the top of separator plate 24 and into chamber 28 between seats 34 and 35 whereupon it passes through opening 26, separator 24 and into subchamber 22. It is then constrained by divider 25 to flow to the process loop from outlet 58, as indicated by the back end of an arrowhead 61 which is symbolic of fluid flowing away from the observer. After completing the process loop, the fluid returns through inlet 57 and is constrained by divider 25 to flow to the opposite side of separator plate 24 through opening 27 as symbolized by the pointed tip of an arrowhead 62. The flow path then continues on the front side of separator 24 and along the outside of chamber 41 after which it returns to the source through nipple 56 and any conduit that is connected with it.

In FIG. 5, valve member 46 is turned angularly as compared with FIG. 4 to achieve flow reversal in the external loop. Here fluid again enters in the same direction through feed inlet 55 and flows over separator plate 24 after which valve member diverts the fluid to the opposite side of the separator plate whereupon the fluid flows out to the process loop through conduit 57 as indicated by the arrowhead 63. The fluid returns from the process loop and exits into the diverter through conduit 58 on one side of separator plate 24 after which it flows to the other side through opening 27 and then over the side of the separator plate 24 that is nearest to the viewer. Flow continues again around the outside of isolating chamber 27 and out of conduit 56 in the same direction as in FIG. 4. Thus, it will be seen that flow direction has only been changed in FIG. 5 insofar as the loop between conduits 57 and 58 is concerned.

One may see in FIG. 4 that the diverter allows a substantial choice insofar as positioning the feed and return conduits 55 and 56 and the loop conduits or outlets 57 and 58 are concerned. For instance, conduit 56 may be located at any desired angle in the space extending going clockwise from chordally directed wall 43 to chordally directed wall 31. Conduit 55 may be at any angle in the space extending counterclockwise from chordally directed wall 43 to chordally directed wall 31. The alternate loop inlets and outlets 57 and 58 as the case may be are located anywhere in their associated semicircular subchambers 21 and 22 and these conduits may come into the sides of the subchambers as well as their rear wall 23 as shown. Thus, it is easy to adapt the inverter to make the most direct approach to any existing piping system rather than to use a multitude of elbows as was required when prior art four-way valves were used for flow reversal.

It should also be recognized in the various embodiments shown that the housings such as 10 and 70 need not be circular or cylindrical in cross section but may be variously shaped.

Figure 6:
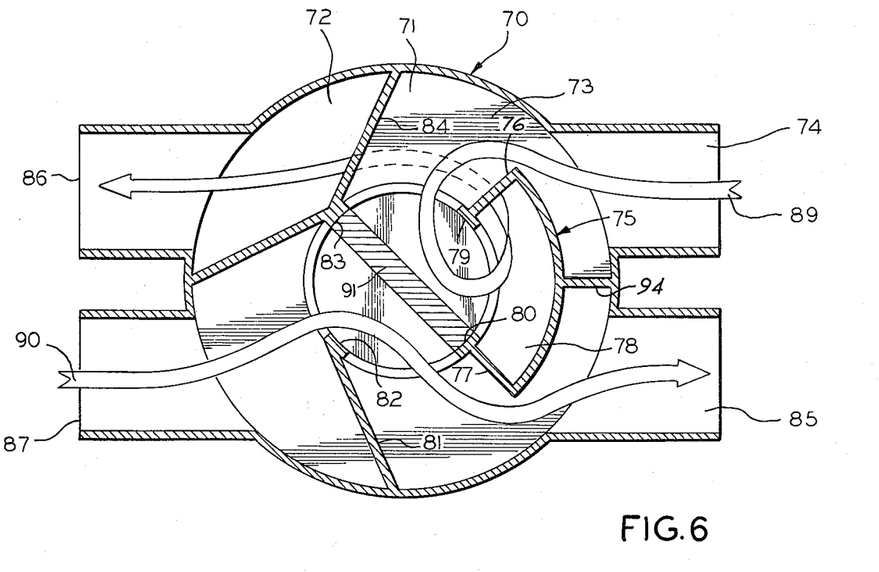
FIG. 6 is an alternative embodiment of the flow diverter, the arrowheaded lines indicating a normal flow direction.
Figure 7:
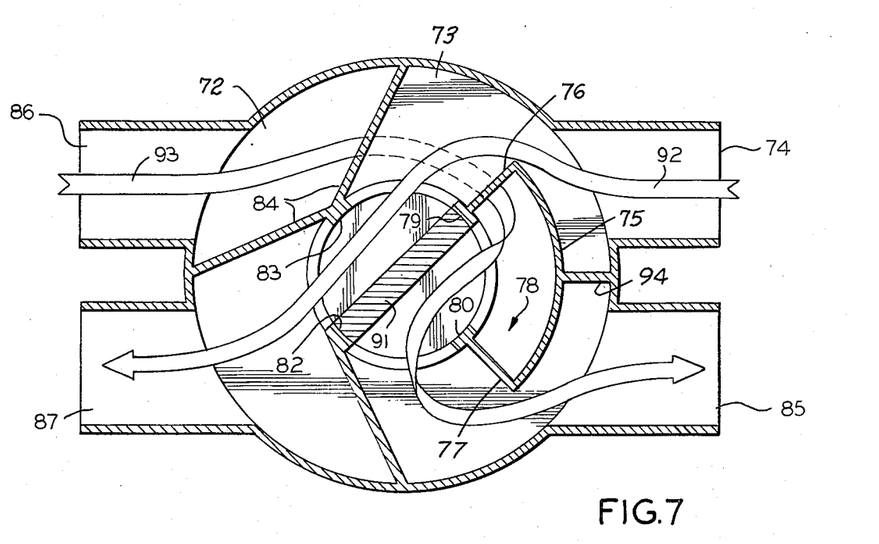
FIG. 7 is structurally similar to FIG. 6 and shows the valve member rotated to a position as compared with FIG. 6 wherein it reverses the direction of flow.

FIGS. 6 and 7 are schematic diagrams of an alternative embodiment of the diverter. The flow in FIG. 7 is reversed as compared with FIG. 6. In FIG. 6 the diverter comprises a housing 70 that is divided into a front chamber 71 and a rear chamber 72 by a transverse separator plate 73. Fluid which maintains a constant flow direction enters an inlet 74 which is on the near or front side of separator plate 73 as depicted. A chamber having a curved wall 75 and radially extending walls 76 and 77 bounds an opening 78 in separator 73. Walls 76 and 77 terminate in valve seats 79 and 80 which are longitudinally extending and can be considered closed on their ends by a cover plate, not shown, which is parallel with separator plate 73 and nearer than separator plate 73 to the viewer of FIG. 6. Another wall 81 within the housing on the front or near side of separator plate 73 has a longitudinally extending valve seat 82. Another valve seat 83 is fastened to angulated but continuous wall 84 which extends longitudinally toward the viewer in FIG. 6 above the plane of separator plate 73. The fluid in conduits 74 is prevented from mixing in the valve due to the presence of a dividing wall 94 which is perpendicular to and sealed to separator plate 73 and is longitudinally coextensive with curved chamber wall 75. The return line to the source is marked 85 and the reversible flow inlets and outlets leading to a process loop are marked 86 and 87. Wall 84 rises towards the viewer so outlet 86 may be above separator plate 73 within the height limit of wall 84 or outlet 86 may be wholly or partially below separator 73. Inlet 87 and return outlet 85 are in the same plane toward the viewer on the near side of separator 73.

For normal flow direction as in FIG. 6, fluid enters the diverter through source inlet 74, travels on separator plate 73 and then passes through opening 78 to the opposite side of the separator plate into a rear chamber which, in this case, is not divided into subchambers. The direction of flow is indicated by the arrowheaded line 89 which is shown in solid lines when on the near or front side of separator 73 and in dashed lines when on the opposite side of the separator plate. Offset wall 84 does not extend rearwardly beyond separator plate 73 away from the viewer in FIG. 6. Thus there is a continuous path from opening 78 and behind separator 73 and up through opening 72 to outlet 86.

After flowing from outlet 86 through the external loop in FIG. 6, fluid returns to the diverter through inlet 87 on the front side of separator plate 73 nearest to the viewer and out by way of outlet 85 for being returned to the source. The return flow path within the diverter is indicated by the arrowheaded line 90. The two flow paths indicated by arrowheaded lines 89 and 90 are, of course, isolated from each other within the diverter by rotary valve member 91.

In FIG. 7 flow direction in the external loop between outlets 86 and 87 of the diverter is reversed as compared with FIG. 6. In FIG. 7, valve member 91 is rotated angularly as compared with the previous figure in which case incoming fluid indicated by the arrowheaded line 92 flows over the front side of separator plate 73 nearest to the viewer and then out through outlet 87 without passing through any opening in separator 73. Fluid then returns from the process loop as indicated by arrowheaded line 93 and flows under separator plate 73 whereupon it emerges from opening 78 and then over the near side of separator plate 73 to source return outlet or line 85. Thus, as the arrowheaded lines in FIGS. 6 and 7 indicate, flow direction in the feed and return lines 74 and 85 remains constant and flow directions in the lines leading to outlets 86 and 87 in response to valve member 91 being actuated between its FIG. 6 and FIG. 7 angular positions.

Figure 8:
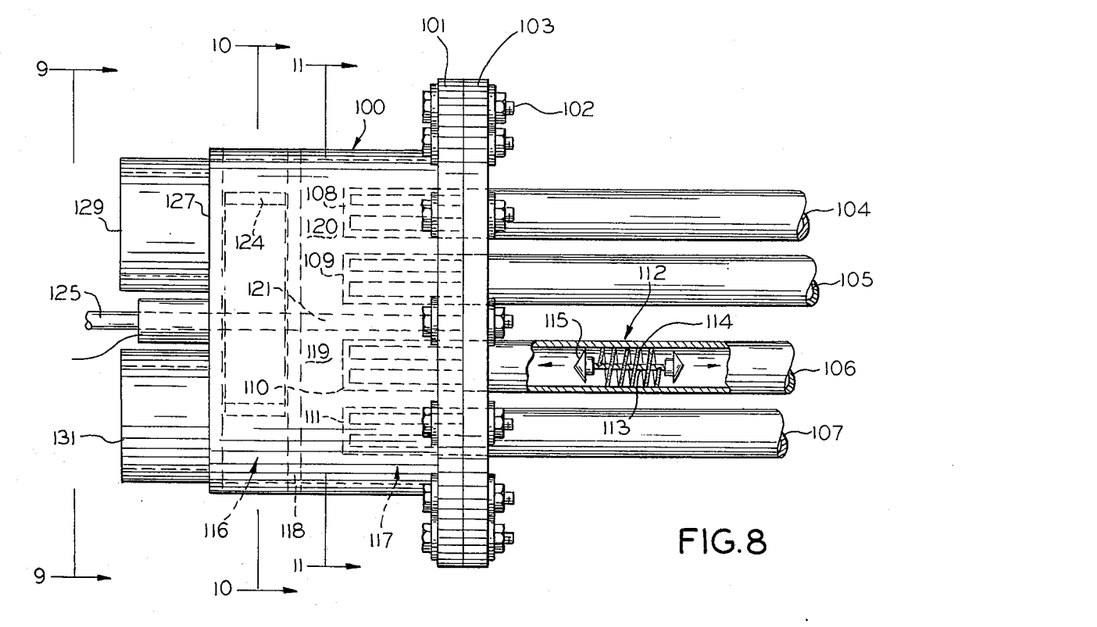
FIG. 8 is a side elevational view of an alternative embodiment of the diverter.

FIGS. 8–13 show an alternative embodiment of the new diverter which is especially adapted for mounting directly on apparatus in which a flow direction is to be reversed periodically instead of being installed in conduits leading to and from the apparatus. In FIG. 8 the cylindrical diverter body 100 has a flange 101 which may be fastened by means of bolts 102 to a flange 103 of a condenser or water cooler which are not shown completely. Flange 103 serves as a tube sheet in which a plurality of coolant conducting tubes such as an upper group 104 and 105 and a lower group 106 and 107 are mounted in a leak-proof manner. Of course, there will be many such tubes in most coolers or heat exchangers so the upper and lower pairs 104, 105 and 106, 107, respectively, should be considered merely representative of larger groups. Assume that normal flow exists when cooling fluid flowing inside of the tubes 104–107 flows to the right out of lower tubes 106 and 107 in FIG. 8 and returns from a loop by way of lower tubes 104 and 105. The directions are opposite for reverse flow, of course. The tubes each terminate in cages such as 108–111. The tubes are occupied by propellable brushes 112. The brushes may be constructed and have the function described in U.S. Pat. No. 3,319,710. The brushes and their functions will be discussed more extensively later. First, the structure of the diverter will be considered.

In FIG. 8, the diverter has a cylindrical body 10 which is divided internally into a first main chamber 116 and a second main chamber 117 by a transverse circular separator 118. The axis of cylindrical body 100 is perpendicular to separator 118. Main chamber 117 is further divided into a lower subchamber 119 and an upper subchamber 120 by a diametrally extending wall or separator 121. The ends of tubes 104 and 105, for instance, with their brush cages 108 and 109 terminate in subchamber 120 and tubes 106 and 107 with their brush cages 110 and 111 terminate in subchamber 119.

Figure 10:
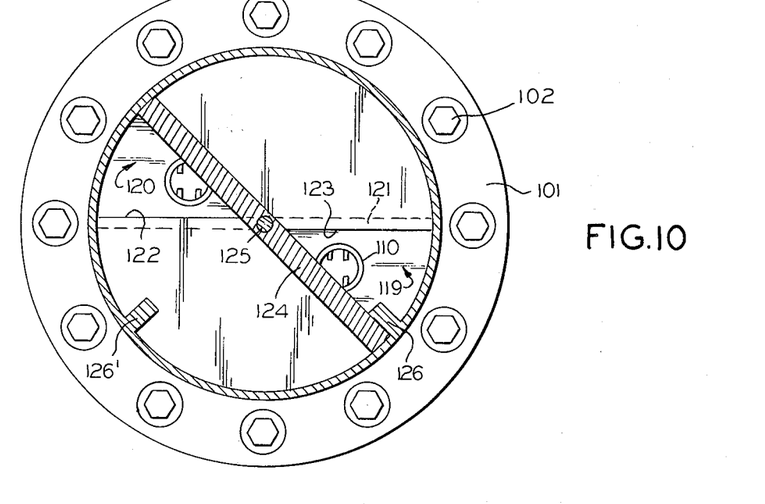
FIG. 10 is a transverse sectional view taken on the line 10—10 in FIG. 8.

As shown in FIG. 10, separator 118 has an opening 122 which communicates the first main chamber 116 with upper subchamber 120. It also has an opening 123 on the opposite side of subchamber divider 121 which communicates a first chamber 116 with lower subchamber 119. Within first chamber 116 there is a movable or rotatable diametrally extending valve member 124 which can move through an angle limited by stops 126 and 126' within chamber 116. Valve member 124 is rotatable on a shaft 125 that extends through a gland 126 in the front end wall 127 of the housing.

Figure 9:
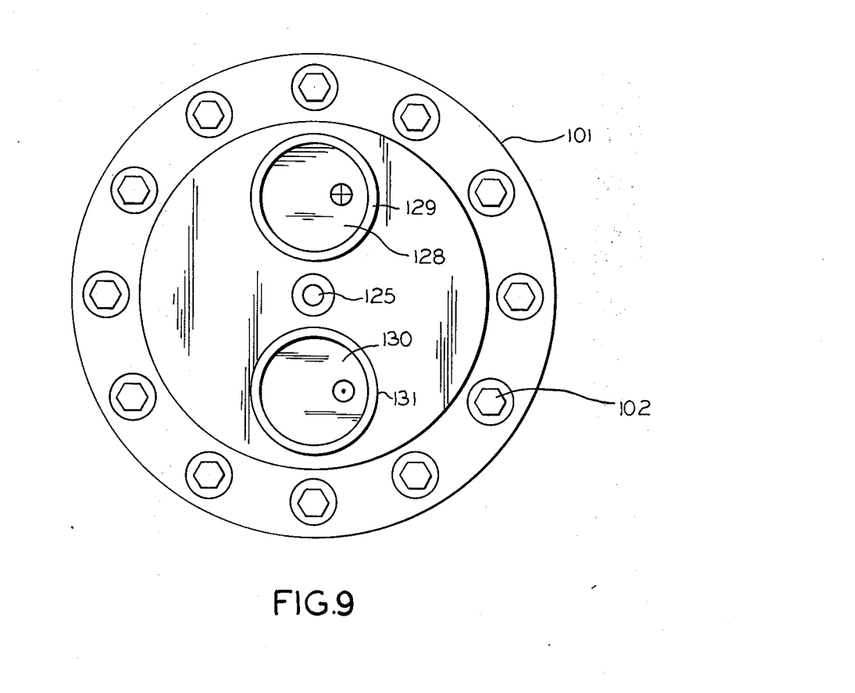
FIG. 9 is an end elevational view taken on the line 9—9 in FIG. 8.

As can be seen in FIGS. 8 and 9, end wall 127 has an inlet opening 128 bounded by a nipple 129 and an outlet opening 130 bounded by a nipple 131. With FIG. 9 superimposed on FIG. 10, it will be evident that inlet opening 128 is in communication with the segment shaped opening when valve member 124 is angulated as shown so that fluid fed to inlet 128 will be directed to lower subchamber 119. For so called normal flow the fluid will then flow through lower tubes such as 106 and 107 and return to upper subchamber 120 through tubes such as 104 and 105 which are connected in an external loop, not shown. As a result of the angular position of valve member 124 in FIG. 10, fluid will then leave the subchamber 120 through segmentally shaped opening 122 and re-enter main chamber 116 below valve member 124 whereupon the fluid may exit through outlet 130 and return to the source.

To change flow direction to the so called reverse direction in tubes 104 and 106, valve member 124 in FIG. 10 is rotated clockwise through an angle away from stop 126 until it abuts stop 126'. Upon this event, the inlet 128 is on the opposite side of valve member 124 so that there is a path leading from inlet 128 through segmentally shaped opening 122 into upper subchamber 120 whereupon the fluid enters the upper tubes 104 and 105 and then loops back through tubes 106 and 107 to lower subchamber 119. The fluid then flows through segmentally shaped opening 123 into the first chamber containing valve member 124 whereupon it continues to flow back to the source out of outlet 130.

It should be noted in all of the embodiments described thus far that the movable valve member such as 48 in FIG. 3, 91 in FIG. 6 and 124 in FIG. 8 need not make a tight fit with its cooperating seats or the cylinder because there is little inclination for leakage in view of pressure drop across the diverter being relatively small.

It should also be noted that the FIGS. 8–10 embodiment affords a choice as to where source inlet and outlet openings 128 and 130 are positioned. They do not necessarily have to be in the end wall 127 of the housing but they may be placed at various angles for extending radially from the housing and first chamber 116 as long as they are on opposite sides of the valve member 124 for any final angular position of the valve member 124.

Figures 11, 12, 13:
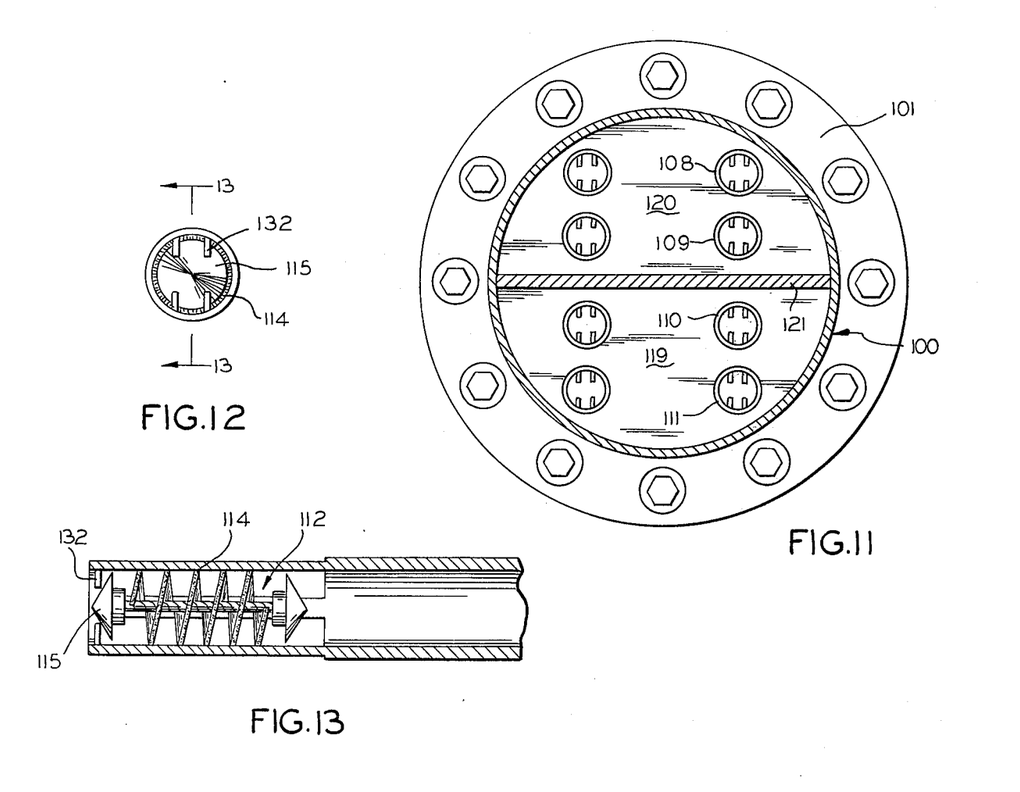
FIG. 11 is a transverse sectional view taken on the line 11—11 in FIG. 8.
FIG. 12 is an end view of a heat exchanger tube in which there is a movable brush as used in the FIG. 8 embodiment.
FIG. 13 is a longitudinal sectional view of a portion of the heat exchanger tube taken on the line 13—13 in FIG. 12.

The brushes which are swept through the tubes in alternate directions by periodically reversing the flow direction through the heat exchanger tubes are depicted to a larger scale in FIGS. 12 and 13. The brushes comprise a twisted wire shaft 113 and helically arranged bristles 114. Each end of shaft 113 has a conical head 115. The heads are stopped by projections 132 in the ends of the longitudinally slotted tube cages. The brushes offer little impediment to flow through the tubes when they are at rest in the cages. In FIG. 13 we may assume that normal flow is occurring from right to left in which case the brushes are driven into their cages and stopped as shown. Of course, one set of brushes in a group of tubes such as lower tubes 106 and 107 would always be in cages at the opposite end from the brushes from the other set of tubes. Upon fluid flow reversal, the brushes exchange positions at opposite ends of the tubes, thus sweeping the sedimentation out of the tubes. A brush 112 at an intermediate position between cages at the opposite ends of tube 106 is depicted in transit immediately after flow reversal. The fit of the brushes with the inner periphery of the tubes is such that the fluid flows with higher velocity than the brushes so any sediment that is loosened is always carried ahead of the brushes by the fluid.

Although different embodiments of the invention have been described in considerable detail, such description is intended to be illustrative rather than limiting, for the invention may be variously embodied and is to be limited only by interpretation of the claims which follow.

We claim:
1. A fluid diverter comprising:
   a. housing means,
   b. separator means for separating said housing means into one and another chambers, said separator means having angularly spaced apart openings therethrough,
   c. a valve member rotatable through an angle in one chamber for controlling fluid flow selectively through said openings,
   d. an inlet and outlet in said housing communicating with said openings,
   e. means dividing said other chamber into subchambers, each of said subchambers having a port for being connected in a fluid flow path in which it is desired to reverse the direction of flow, f. said valve member when in one angular position defining simultaneously two fluid flow paths, one being between said inlet and one port and the other being between said other port and said outlet, and when said valve member is in another angular position defining simultaneously alternate fluid flow paths, one being between said inlet and said other port and the other being between said one port and said outlet.

2. The device defined in claim 1 wherein:

a. said valve member comprises a vane having opposed sides and longitudinally extending spaced apart sealing edges, said vane being rotatable about a longitudinal axis, b. generally U-shaped wall means extending longitudinally from said separator means in said one chamber and defining an open-sided enclosure for each of said openings, respectively, said wall means having seat means contiguous therewith for cooperating with said vane to effect seals for isolating fluid flow on said opposed sides of said vane, and c. partition wall means disposed between at least one of said U-shaped wall means and said housing for isolating said inlet and outlet from each other and for permitting said inlet and outlet, respectively, to be at various locations in said one chamber.

3. The device defined in claim 2 including a shaft extending from said vane sealingly through said housing for enabling rotation of said vane means from the exterior of said housing means.

4. A fluid diverter comprising:

a. a generally cylindrical housing and axially separated walls enclosing opposite ends thereof, b. separator means extending across the interior of said housing transversely to the cylinder axis for dividing said cylinder into two chambers, said separator means having angularly displaced openings, c. a valve member rotatable between angular positions in one of said chambers about an axis in substantial parallelism with the axis of said housing, said valve member having axially extending spaced apart edges and opposed sides, d. means extending in an axial direction from said separator means adjacent said openings, respectively, said means each having axially extending seat means for being engaged in sealing relation by said edges of said valve member, e. said means extending in an axial direction being constructed and arranged for alternate pairs of said seat means to be engaged by said valve means edges when said valve means is in alternate angular positions, whereby to provide for alternate flow directions through said openings, f. inlet and outlet means communicated with opposite sides of said valve member, respectively, in said one chamber, g. port means for conducting fluid in selectively opposite directions depending on the angular position of said valve member, and h. means for actuating said valve member angularly.

5. A device for changing the flow direction of fluid comprising:

a. a first chamber having two pairs of openings identified as first and second openings in each pair, b. second and third chambers which are isolated from each other and are in communication with said first chamber by way of said first and second openings, respectively, of said other pair, c. a movable imperforate valve member in said chamber which in one position defines a fluid flow path from the first opening in one pair to the first opening in the other pair and from the second opening in said other pair to the second opening in said one pair and which valve member in another position defines a fluid flow path from the first opening in said one pair to the second opening in said other pair and from the first opening in said other pair to the second opening in said one pair, and d. means extending sealingly through said chamber from said valve member to enable movement thereof from outside of said chamber.

6. The device defined in claim 5 wherein:

a. the interior of said chamber is cylindrical and said valve member is rotatable through an angle in said chamber.

7. The device defined in claim 5 wherein:

a. said second and third chambers each have means for coupling between them an external fluid circuit in which flow may be reversed by changing the position of said valve member.

8. The device defined in claim 5 including:

a. a group of tubes with their corresponding ends terminating in said second chamber and another group of tubes with their corresponding ends terminating in said third chamber, b. movable tube cleaning elements in said tubes, said elements being movable reciprocally and alternately toward and away from said chambers in correspondence with the direction of flow effected by the selected position of said valve member.

9. The device defined in claim 8 wherein said tube cleaning elements are brushes.

10. A fluid flow control device comprising:

a. a housing having transverse wall means therein for dividing said housing into first and second chambers, said wall means having an opening communicating said chambers, b. said housing having first, second and third ports communicating with said first chamber and a fourth port communicating with said second chamber, c. a movable valve member in said first chamber and means for moving said valve member between one and another positions, d. said valve member when in said one position defining independent fluid flow paths within said housing, one of said paths being from said first port through said wall means opening to said second chamber and said fourth port and another of said paths being from said third port and through said first chamber to said second port, e. said valve member when in said another position defining other independent flow paths within said housing, one of said paths being from said first port on one side of said wall means to said third port and another of said paths being from said fourth port and through said second chamber and said wall means opening to said second port.

11. A fluid flow control device comprising:

a. a housing including longitudinally extending perimetral wall means and generally transverse opposite end wall means and generally transverse internal divider wall means for dividing said housing into first and second chambers, said divider wall means having an opening for communicating said chambers, b. said housing having first, second and third ports in communication with said first chamber on one side of said internal divider wall means and a fourth port in communication with said second chamber, c. a valve member in said first chamber rotatable about a generally longitudinally directed axis between first and second angular positions, and means for rotating said valve member from outside of said housing, d. enclosure means in said first chamber displaced radially from said axis and extending angularly about said axis to define an included angle within which said transverse wall opening lies, and means interposed between said enclosure means and said perimetral wall for isolating said first from said second port, e. first and second angularly spaced valve seat means associated with said enclosure means, f. longitudinally extending enclosure wall means having an opening in communication with said third port and third and fourth angularly spaced valve seat means defining said opening, g. said valve member when in said one angular position sealingly engaging said second and fourth seat means to define a fluid flow path extending from said first port, through said first chamber on said one side of said transverse wall, through said transverse wall opening, to said second chamber and to said fourth port and another fluid flow path from said third port through said first chamber on said one side of said transverse wall and to said second port, h. said valve member when in said another angular position sealingly engaging said first and third valve seat means to define a fluid flow path from said first port, through said first chamber on one side of said transverse wall means, through said longitudinal wall open and to said third port means and another fluid flow path from said fourth port, through said second chamber and said transverse wall opening to said second port.

12. The device defined in claim 11 wherein a first portion of said longitudinally extending wall means is spaced inwardly toward said away from the inside of said perimetral wall means to define a longitudinally extending space therewith that is in communication with said fourth port to enable selectively locating said fourth port variously along the perimetral and longitudinal dimensions of said perimetral wall.

13. The device set forth in claim 12 wherein said enclosure means for said transverse wall opening includes radially inwardly extending portions with which said angularly spaced first and second seats are associated, said enclosure means and the aforesaid isolating means extending a substantial distance longitudinally of said first chamber from said transverse wall to thereby enable selectively locating said first and second ports, respectively, variously along the perimetral and longitudinal dimensions of said perimetral wall.

14. The device set forth in claim 12 wherein a second portion of said longitudinally extending wall means extends from the inside of said perimetral wall means toward said first portion to thereby define in conjunction with said perimetral wall a space in communication with said third port on one side of said transverse wall which space extends a substantial longitudinal distance from said transverse wall to enable selectively locating said third port variously along the perimetral and longitudinal dimensions of said perimetral wall.

15. A fluid flow control device comprising:

a. a first chamber defined by longitudinally extending perimetral wall means and longitudinally spaced apart first and second laterally extending end wall means, said first end walls means having a pair of ports therein and said second end wall means having first and second angularly spaced openings, b. second chamber means adjacent said first chamber and defined by longitudinally extending perimetral wall means and by said second end wall means, c. partition means extending laterally and longitudinally in said second chamber for dividing it into first and second subchambers, said first opening in said second end wall means communicating said first subchamber with said first chamber and said second opening in said second end wall means communicating said second chamber with said first chamber, said subchamber having inlet and outlet means for communicating with external fluid loop means, d. a valve member mounted for movement between one and another positions in said first chamber, said member when in one position dividing said first chamber such that there is fluid flow paths between one of said ports and the first of said openings in said second end wall means and between the other of said ports and the second of said openings in said second end wall means, and said member when in said another of its positions dividing said first chamber such that there are fluid flow paths between the other of said ports and the first of said openings and between said one port and the second of said openings, whereupon moving said valve member will change the fluid flow directions in said subchambers and said external fluid loop means, and e. means extending sealingly from said first chamber and connected to said valve member to enable movement from outside of said chamber.

16. The device set forth in claim 15 including:

a. separate groups of tubular means in which fluid flow direction reversal is desired, having their corresponding one ends in communication with said first and second subchambers, respectively, b. heat exchanger means into which said groups of tubular means extend and including means for putting corresponding other ends of said tubular means in each group remote from said subchambers in fluid flow communication, and c. means for coupling said subchambers to said heat exchanger means.

17. The device set forth in claim 16 including:

a. brush means disposed in said tubular means for being propelled alternately between said one ends and said other remote ends of said tubular means and reversely in response to flow reversal through said tubular means.

* * * * *